(12) United States Patent
Lo et al.

(10) Patent No.: US 12,397,201 B2
(45) Date of Patent: Aug. 26, 2025

(54) RESISTANCE ADJUSTABLE POWER GENERATOR

(71) Applicants: Chia Yu Lo, Taichung (TW); Kuang-Yang Liao, Taichung (TW)

(72) Inventors: Chia Yu Lo, Taichung (TW); Kuang-Yang Liao, Taichung (TW)

( * ) Notice: Subject to any disclaimer, the term of this patent is extended or adjusted under 35 U.S.C. 154(b) by 240 days.

(21) Appl. No.: 18/456,901

(22) Filed: Aug. 28, 2023

(65) Prior Publication Data
US 2024/0075345 A1 Mar. 7, 2024

(30) Foreign Application Priority Data
Sep. 6, 2022 (TW) .................. 111133876

(51) Int. Cl.
| | | |
|---|---|---|
| *A63B 24/00* | (2006.01) | |
| *A63B 21/00* | (2006.01) | |
| *A63B 21/005* | (2006.01) | |
| *A63B 22/00* | (2006.01) | |
| *H02K 7/108* | (2006.01) | |
| *H02K 7/116* | (2006.01) | |
| *H02K 7/18* | (2006.01) | |
| *A63B 71/06* | (2006.01) | |

(52) U.S. Cl.
CPC ...... *A63B 24/0087* (2013.01); *A63B 21/0058* (2013.01); *A63B 21/151* (2013.01); *A63B 22/0076* (2013.01); *H02K 7/108* (2013.01); *H02K 7/116* (2013.01); *H02K 7/1853* (2013.01); *A63B 2071/0675* (2013.01)

(58) Field of Classification Search
CPC ........ A63B 24/0087; A63B 2024/0093; A63B 2024/0081; A63B 21/0058; A63B 21/151; A63B 21/0051; A63B 21/0052; A63B 21/0054; A63B 21/0055; A63B 21/225; A63B 21/0053; A63B 21/00181; A63B 21/0056; A63B 21/0057; A63B 21/00192; A63B 22/0076; A63B 22/0605; A63B 71/0619; A63B 2071/0675; A63B 2071/0081; A63B 2220/12; A63B 2220/62; A63B 2225/50; A63B 2069/167; A63B 69/16; H02K 7/108; H02K 7/116; H02K 7/1853; H02K 7/1861
See application file for complete search history.

(56) References Cited

U.S. PATENT DOCUMENTS

| | | | | |
|---|---|---|---|---|
| 7,156,780 B1 * | 1/2007 | Fuchs | ...................... | B62M 6/45 |
| | | | | 482/92 |
| 2005/0140113 A1 * | 6/2005 | Kokatsu | ............. | A63B 22/0605 |
| | | | | 280/205 |
| 2012/0178592 A1 * | 7/2012 | Chieh | ................ | A63B 22/0605 |
| | | | | 482/57 |

(Continued)

*Primary Examiner* — Timothy Hannon
(74) *Attorney, Agent, or Firm* — Best & Flanagan LLP

(57) ABSTRACT a resistance adjustable power generator having: an operating unit that receives commands of a user and is able to switch the resistance adjustable power generator to either a release mode or a resistance mode; a resistance generating unit that receive the commands from the operating unit and provides adjustable multiple levels of resistance to a connecting device, with the resistance generating unit having a resistance controlling center, multiple resistance generator, and an output controlling center; and a battery electrically connects to the resistance generating unit.

20 Claims, 8 Drawing Sheets

(56) References Cited

U.S. PATENT DOCUMENTS

2015/0343290 A1* 12/2015 Freiberg ................ A63B 69/16
  482/5
2016/0031525 A1*  2/2016 Craven ................. B62K 25/02
  180/206.7

* cited by examiner

RESISTANCE ADJUSTABLE POWER GENERATOR

FIELD OF INVENTION

The present invention relates generally to a power generator, and particularly to a resistance adjustable power generator.

BACKGROUND OF THE INVENTION

In today's health-conscious society, regular exercise has become an indispensable part of people's lives to improve physical fitness and overall well-being. However, the effectiveness of traditional fitness devices is hindered by a significant challenge of their unwieldy and bulky nature. This often discourages individuals from incorporating exercise into their daily routines due to space constraints and lack of convenience. Moreover, a considerable amount of energy is expended during workouts, only to be wasted without any means of harnessing or storing it. To address these pressing issues, there is a growing demand for the development of a compact, portable, and energy storing fitness device that is capable of efficiently storing the energy generated during exercise, making a positive contribution to environmental sustainability.

SUMMARY OF THE INVENTION

Therefore, it is a primary objective of the present invention to provide a resistance adjustable power generator comprising an operating unit, a resistance generating unit, and a battery, wherein:
the operating unit receives commands of a user and exchanges signals or the commands with the resistance generating unit, and the operating unit is able to switch the resistance adjustable power generator to either a release mode or a resistance mode, wherein in the resistance mode, the resistance generating unit provides multiple levels of resistance to a connecting device; and
the resistance generating unit receive the commands from the operating unit and provides adjustable multiple levels of resistance to a connecting device, wherein the resistance generating unit comprises a resistance controlling center, multiple resistance generator, and an output controlling center, wherein the resistance controlling center controls movements of a clutch, controls the status of multiple resistance generators, and controls an electrical energy output by an output controlling center to tune multiple levels of the resistance, wherein: the clutch engages with the connecting device in the resistance mode and creates a first level of the resistance, and the clutch disengages from the connecting device in the riding mode, wherein the clutch is connected to an accelerator, and the accelerator increases the rotational speed of a coil winding in the resistance generator; the resistance generator connects to the clutch and comprises the coil winding, wherein the coil winding generates electrical energy during rotation; and the output controlling center regulates output values of voltage and/or current to modify the load output and generates adjustable multiple levels of the resistance and stores the electrical energy into the battery.

Wherein, the clutch connects to the accelerator, and the accelerator comprises a hub gear mounted on a hub of the connecting device and a resistance gear mounted on the resistance generator, wherein the hub gear and the resistance gear are arranged to engage with each other directly or indirectly, and the number of teeth of the hub gear is greater than that of the resistance gear.

Wherein, the accelerator comprises at least one planetary gearset.

Wherein, the connecting device is a rear wheel of a bicycle, a pulley, or a flywheel.

Wherein, the operating unit is a human-machine interface in a form of buttons, controllers, touch display panels, or mobile devices, and the operating unit receives inputs from a user, generates multiple commands, and sends the commands to the control center wirelessly or wired to tune multiple levels of the resistance.

Wherein, the resistance generating unit comprises a resistance device; and the output controlling center adjust the resistance of the resistance device based on the electrical energy produced by the resistance generator.

Wherein, the operating unit further comprises a course database with multiple exercise courses, wherein the operating unit adjusts settings of the resistance generating unit based on predefined parameters of simulation conditions associated with the exercise course or parameters specified by an instructor of the exercise course.

Wherein, the resistance adjustable power generator is used in a fitness device.

Wherein, the fitness device is a rowing machine or a chest press machine.

The resistance adjustable power generator of this invention can be applied to various fitness devices to provide resistance training of the user, and thus greatly reduces the sizes of the fitness devices and provides consistent resistance and harvests electricity at the same time during the training of the user.

DETAILED DESCRIPTION OF THE PREFERRED EMBODIMENTS

Figure 1:
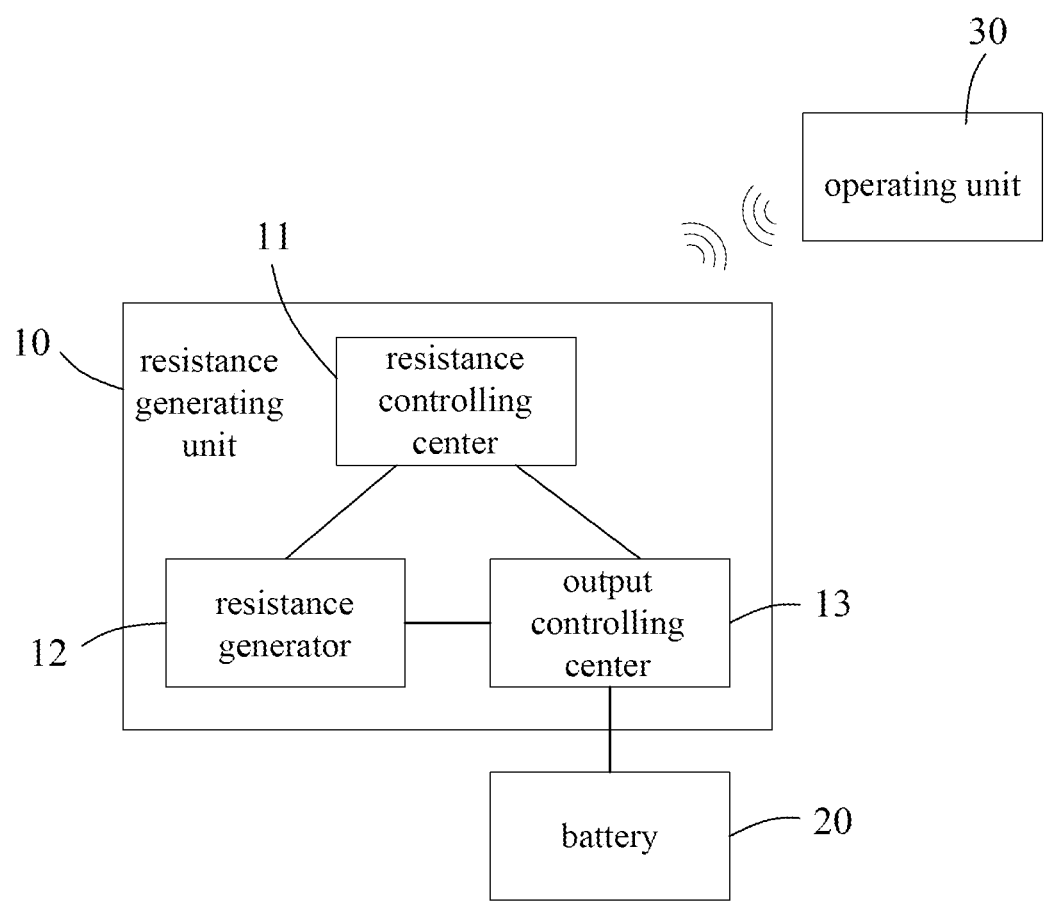
FIG. 1 is a block diagram of a preferred embodiment of a resistance adjustable power generator in accordance with this invention.

In order to make purposes, technical solutions, and advantages of the present invention to be clearer, the following content provides some preferred embodiments in accordance with the present invention.

With reference to FIG. 1 to FIG. 4, a resistance adjustable power generator in accordance of this invention comprises an operating unit 30, a resistance generating unit 10, and a battery 20. The resistance generating unit 10 provides adjustable resistance to a connecting device (not shown). The resistance generating unit 10 is electrically connected to the battery 20, and the resistance generating unit 10 and the operating unit 30 can exchange messages mutually.

The term "electrically connected" can be either a wired or wireless connection. The term "mutual message exchange" refers to the exchange of data or commands between the operating unit 30 and the resistance generating unit 10.

The operating unit 30 receives the commands in the form of a user operation. The operating unit 30 can take various forms, such as a button, a controller, a touch display panel, a mobile device, or any other human-machine interface (HMI) that can display information and send the commands, and the operating unit 30 can input commands or display output results.

The operating unit 30 is used to receive signals or commands from the resistance generating unit 10 and the battery 20, and the operating unit 30 also generates corresponding responses and output controls accordingly. For example, the operating unit 30 can drive the resistance generating unit 10 to provide resistance and charge the battery 20. The signal received by the operating unit 30 can include information such as the remaining power and health status of the battery 20 or abnormal messages generated by the resistance generating unit 10. The operating unit 30 can then provide feedback to the user based on the received signals.

The operating unit 30 can further connect to a terminal device of the user via wireless network transmission technology and synchronously transmit the signals or the commands to the terminal device.

Preferably, the operating unit 30 can utilize GNSS signals, such as GPS signals, and through network transmission to achieve real-time monitoring. For example, the operating unit 30 can be a controller with a universal communication protocol, such as a controller that follows the Controller Area Network (CANBUS), Bluetooth Low Energy (BLE), ANT+, or Fitness Machine Service (FTMS) protocols. The operating unit 30 communicates with the battery 20 and the resistance generating unit 10 through the protocol(s), either wirelessly or wired.

The resistance generating unit 10 reads the signals from the operating unit 30, obtains the power status signal from the battery 20, and adjusts output of resistance based on the multiple signals received. Furthermore, the resistance generating unit 10 can be connected to the terminal device of the user wirelessly, and synchronously transmit the signals or commands to the terminal device.

The resistance adjustable power generator in accordance with this invention includes a release mode and a resistance mode. The user can give instructions to the operating unit 30 or the terminal device such as a mobile device to switch between the release mode and resistance mode of the resistance adjustable power generator according to the user.

When the resistance adjustable power generator is in the release mode, the user can use it without activating the resistance generating unit 10. The battery 20 can still output electric energy in the release mode.

When the resistance adjustable power generator is in the resistance mode, the operating unit 30 activates the resistance generating unit 10 to establish an electrical connection with the battery 20. As the resistance generating unit 10 is activated, the resistance generating unit 10 converts mechanical energy generated from the user that transmits through the connecting device into electrical energy, and the electrical energy is then stored in the battery 20 as chemical energy. This allows the user 10 to charge the battery 20 while working out, making the resistance adjustable power generator of this invention an energy-efficient and environmentally-friendly option.

Moreover, the resistance adjustable power generator can automatically switch between the release mode and the resistance mode. For example, when the user starts to work out, the resistance adjustable power generator can automatically switch to the resistance mode and activates the resistance generating unit 10, making the resistance generating unit 10 instantly convert energy from the user and charge the battery 20. After the user stops workout for a while, the resistance adjustable power generator can automatically switch to the release mode and turn off the resistance generating unit 10.

Similarly, the user can still decide whether the resistance adjustable power generator should automatically switch between the release mode and the resistance mode with the operating unit 30. This can prevent the resistance adjustable power generator from repeatedly switching between the release mode and the resistance mode.

The resistance generating unit 10 is in the form of a generator. The generator can be a magnetic reluctance device, a contact friction device, or a combination of both. The resistance generating unit 10 provides rotational resistance to the connecting device, and thus configured the connecting device with multiple levels of resistance in the resistance mode to meet various resistive force requirements.

The connecting device can be a rear wheel of a bicycle, a pulley, or a flywheel. In a preferred embodiment, the connecting device is a rear wheel of an electric bicycle, and the resistance generating unit 10 is placed at the rear wheel of the electric bicycle. In this embodiment, the resistance generating unit 10 adjusts the output load of the multi-level resistance by regulating the voltage and/or current output, or by turning on/off multiple coil windings according to meet the demand for different scales of resistance. This enables the adjustment of multiple level outputs of resistance. The magnetic reluctance device of the resistance generating unit 10 can generate magnetic resistance on the wheel of the electric bicycle by utilizing the interaction between magnets and eddy currents, and the resistance generating unit 10 can regulate the output voltage and/or current, or turn on/off multiple coil windings to adjust the generated magnetic resistance. The contact friction device of the resistance generating unit 10 directly provides different levels of rotational resistance to the connecting device, such as the rear wheel of the bicycle, the pulley, or the flywheel, by direct contact.

With reference to FIG. 1 to FIG. 4, the resistance generating unit 10 comprises a resistance controlling center 11, a resistance generator 12, and an output controlling center 13 that are electrically interconnected. The resistance controlling center 11 receives signals transmitted from the operating unit 30, determines whether the resistance generator 12 should be activated, and determines the amount of electrical energy to be outputted by the output controlling center 13 to the battery 20.

The resistance generator 12 in the present embodiment includes a coil winding. The resistance generator 12 produces the electrical energy by the rotation of a hub of the connecting device relative to the coil winding and simultaneously generates rotational resistance on the connecting device. The resistance generator 12 is able to provide the connecting device multiple levels of resistance in the resistance mode.

Figure 2:
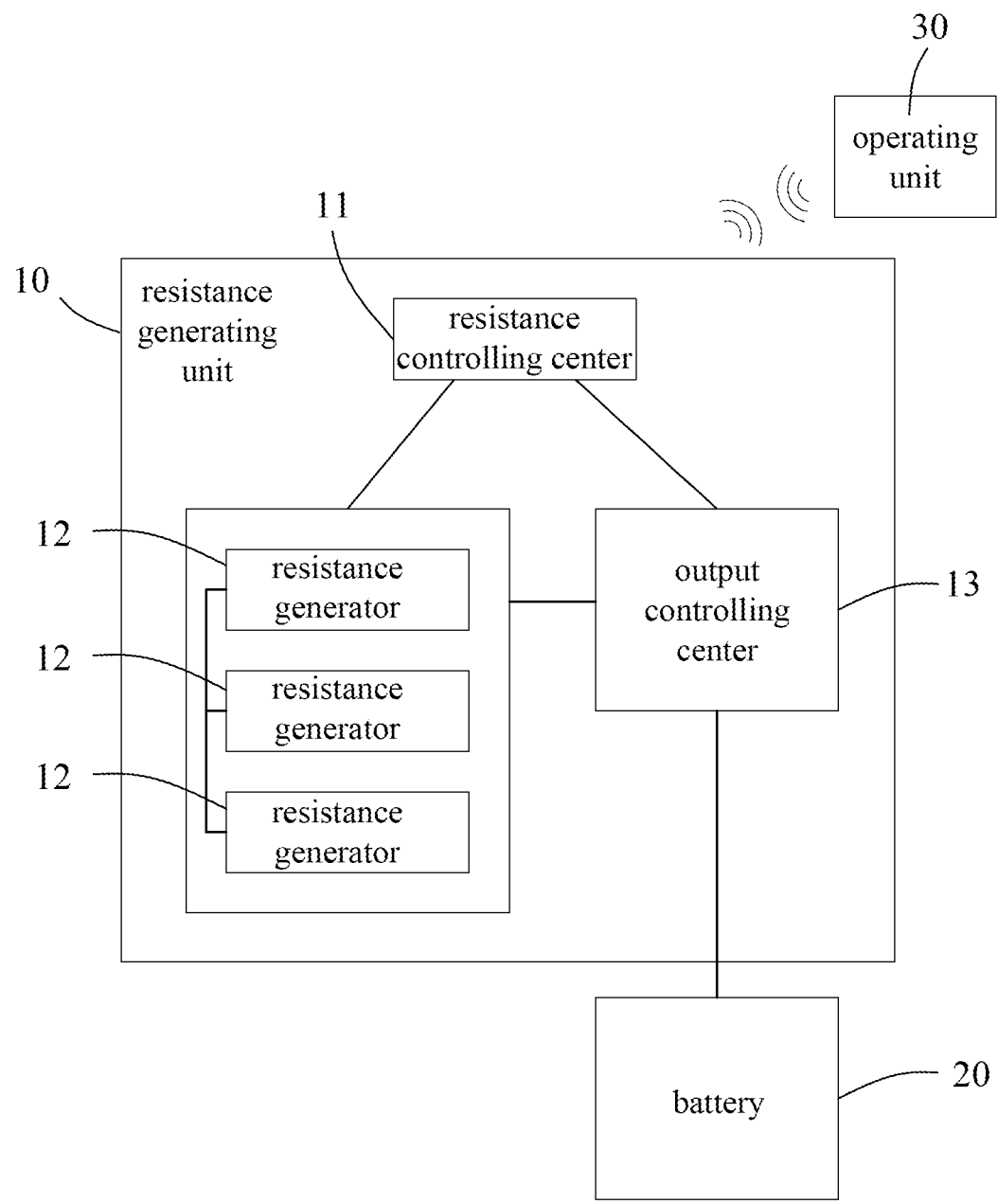
FIG. 2 is a block diagram of a preferred embodiment of a resistance adjustable power generator in accordance with this invention.

In a preferred embodiment in accordance with this invention as shown in FIG. 2, the resistance generating unit 10 includes several resistance generators 12, and the number of the resistance generators 12 to be turned on or turned off can be determined based on the level of resistance set in the resistance mode. The more resistance generators 12 that are turned on, the greater the rotational resistance and the greater the resistance applied to the connecting device, resulting in greater resistance.

The output controlling center 13 is further used to regulate and set the output value of voltage and/or current. The output controlling center 13 can allocate the electrical energy generated by the resistance generator 12 and the energy output from the battery 20. The output controlling center 13 can also modify the output of electric load (i.e., output load) through voltage transformation and/or rectification, thereby adjusting the resistance levels during the rotation of the hub to achieve different levels of resistance.

By tuning the on and off of multiple resistance generators 12 or adjusting the output of the output controlling center 13, the resistance adjustable power generator can possess variable resistance modes with multiple resistance levels. This allows the electric bicycle 10 to offer various levels of resistance for different workout experiences.

Figure 3:
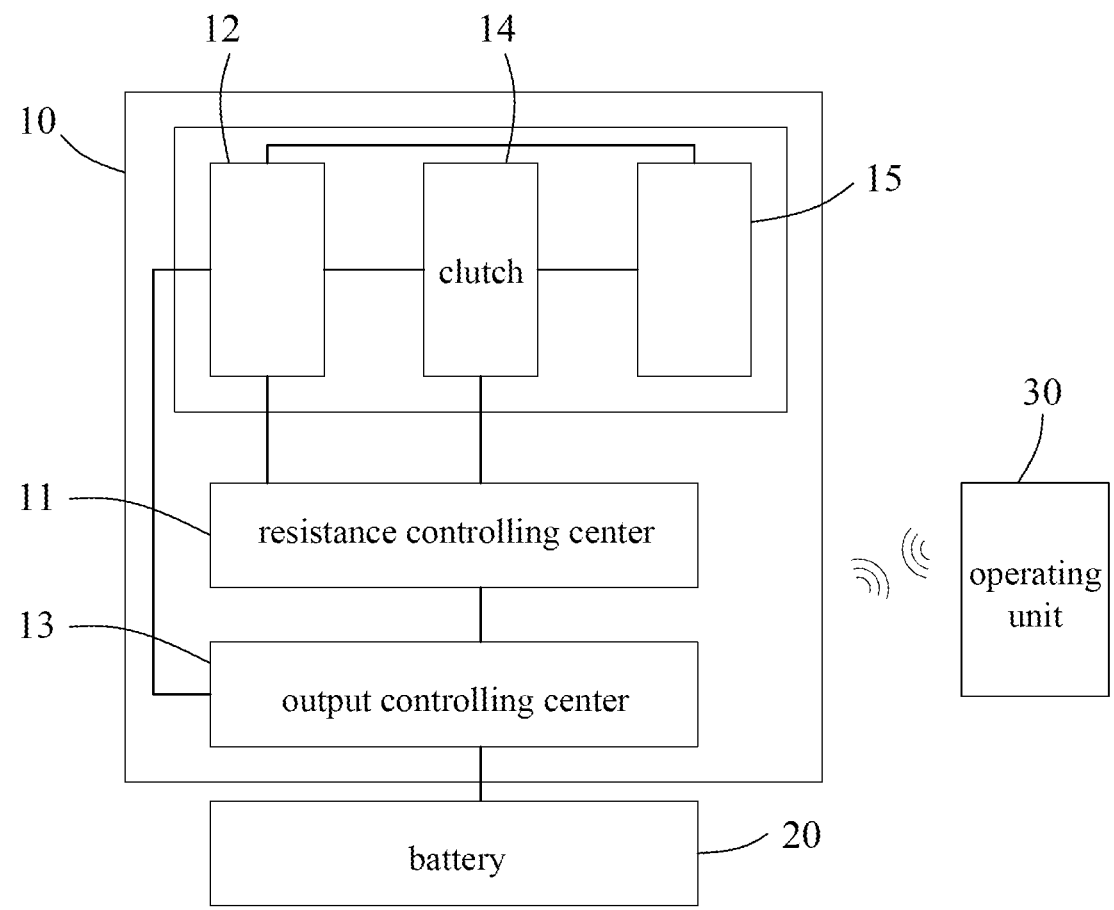
FIG. 3 is a block diagram of a preferred embodiment of a resistance adjustable power generator in accordance with this invention.

In a preferred embodiment, as shown in FIG. 3, the resistance generating unit 10 is positioned on the hub of the connecting device, and the resistance generating unit 10 is detachably connected to the hub. Moreover, the resistance generating unit 10 is equipped with a clutch 14. The clutch 14 operates according to the mode specified by the resistance controlling center 11. In the release mode, the clutch 14 disengages from the connecting device and disconnects the resistance generators 12 from the connecting device, reducing the resistance of the connecting device. When the resistance adjustable power generator switches to the resistance mode, the clutch 14 engages with the connecting device and creates a first level of riding resistance.

Figure 5:
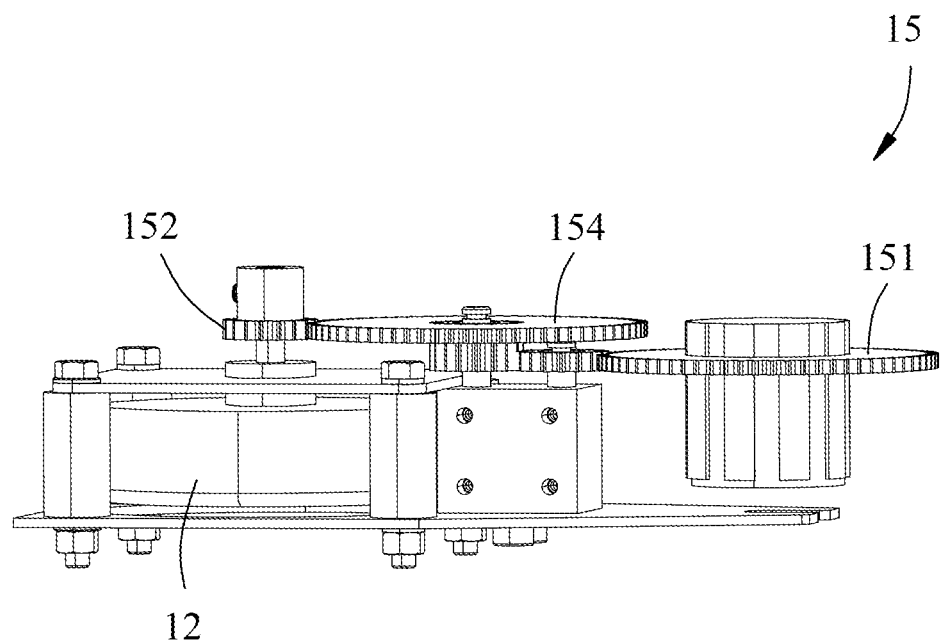
FIG. 5 is a schematic diagram of a preferred embodiment of a resistance adjustable power generator in accordance with this invention.

In a preferred embodiment shown in FIG. 3 and FIG. 5, the resistance generating unit 10 includes an accelerator 15. The accelerator 15 is designed to increase the rotational speed of the coil winding in the resistance generator 12. Preferably, the accelerator 15 includes a hub gear 151 mounted on the hub and a resistance gear 152 mounted on the resistance generator 12, wherein the hub gear 151 and the resistance gear 152 are arranged to engage with each other directly or indirectly. By adjusting the gear ratio between the hub gear 151 and the resistance gear 152 (e.g., by having a much greater number of teeth on the hub gear 151 compared to the resistance gear 152), the overall rotational speed of the resistance generator 12 can be significantly greater than that of the hub gear 151. In this preferred embodiment, an idler gear 154 is provided between the hub gear and the resistance generator 12 to prevent any interference between the components. This idler gear 154 ensures smooth and efficient transmission of rotational motion between the hub gear 151 and the resistance generator 12.

Figure 6:
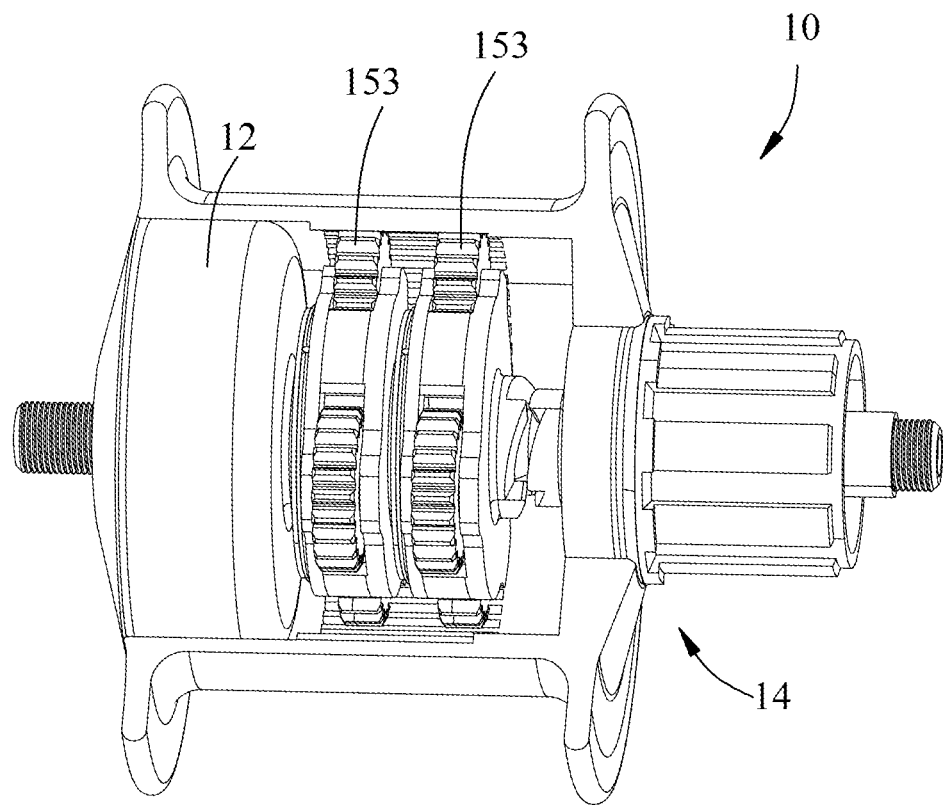
FIG. 6 is a schematic diagram of a preferred embodiment of a resistance adjustable power generator in accordance with this invention.

With reference to FIG. 6, a preferred embodiment of the resistance generating unit 10 is installed on the hub of the connecting device and the resistance generating unit 10 also includes the resistance generator 12, the clutch 14, and the accelerator 15. The accelerator 15 is positioned between the resistance generator 12 and the clutch 14. Preferably, the accelerator 15 includes at least one planetary gearset 153. In a preferred configuration, the accelerator 15 consists of two parallel planetary gearsets 1553 positioned next to the resistance generator 12. In the resistance mode, the clutch 14 engages with the hub of the connecting device. The hub is coupled with a chain or a cable of the connecting device and the hub is driven by the chain or the cable of the connecting device, and the planetary gearset 153 rotates in accordance with the rotation of the hub of the connecting device; thereby the planetary gearset 1553 drives the operation of the resistance generator 12 and greatly increase the rotation speed of the coil winding of the resistance generator 12. This configuration of the planetary gearset 153 enables a significant reduction in overall size of the resistance generator 12 while achieving increased efficiency in generating resistance and generating electricity. In the release mode, the clutch 14 disengages from the hub of the connecting device and reduces rotational resistance of the connecting device.

Figure 4:
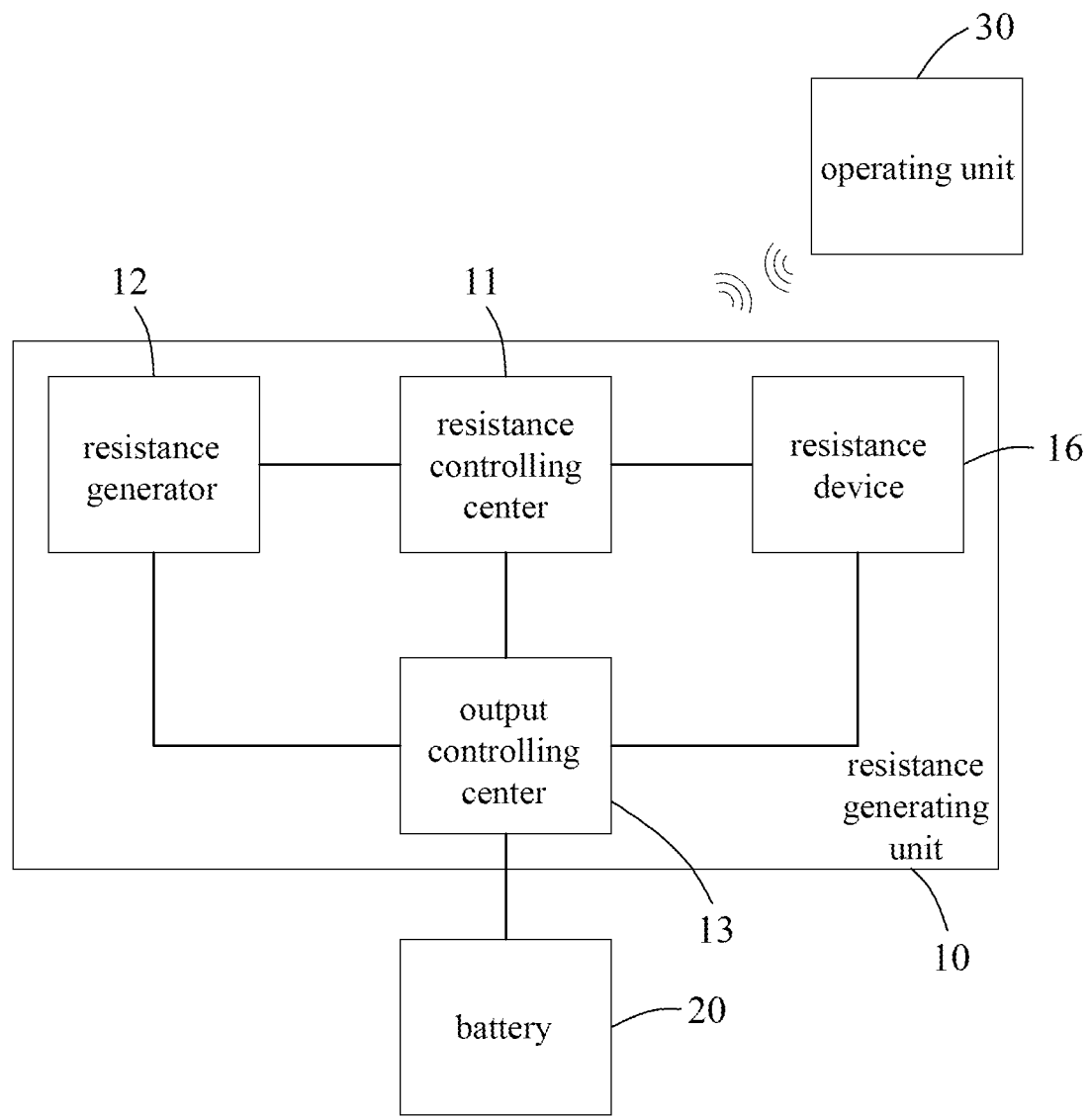
FIG. 4 is a block diagram of a preferred embodiment of a resistance adjustable power generator in accordance with this invention.

With reference to FIG. 4, in a preferred embodiment, the resistance generating unit 10 can also include a resistance device 16, which directly generates resistance to avoid insufficient resistance provided by the resistance generator (s) 12, ensuring sufficient training functionality. The resistance controlling center 11 receives signals from the operating unit 30 and activates the resistance generator 12 based on the settings of the resistance mode. In this preferred embodiment, the output controlling center 13 can determine the activation and tuning of the resistance device 16 based on the resistance generated by the resistance generator 12. This ensures that the resistance generating unit 10 can provide stable resistance in the resistance mode, regardless of the force or speed the user pulls the cable or the chain or the amount of energy generated by the resistance generator 12.

Furthermore, in another preferred embodiment, the resistance generating unit 10 serves as a braking assistance device. For example, during braking of the bicycle, the resistance generating unit 10 receives a brake signal from the bicycle. The resistance controlling center 11 determines the level of resistance to be generated by either the resistance generating unit 10 or the output controlling center 13 based on the brake signal. In another example, the resistance controlling center 11 determines the level of resistance to be generated by either the resistance generating unit 10 or the output controlling center 13 based on the workout conditions of the user.

Preferably, the operating unit 30 also includes a course database, which contains several exercise courses generated based on simulation conditions. The user can select an exercise course through the operating unit 30. The operating unit 30 adjusts the settings of the resistance generating unit 10 based on predefined parameters of the simulation conditions associated with the exercise course or parameters specified by an instructor of the exercise course. This adjustment can be done by modifying the configuration parameters of the resistance generating unit 10.

Furthermore, the user can also adjust the parameters of the exercise course according to preferences using the operating unit 30. This allows for customization of the exercise course, tailoring the exercise course to the user's specific needs and goals.

The operating unit 30 also includes a data storage unit. The data storage unit is used to store the execution records and parameters of each exercise course. The execution records may include the duration of the exercise course, rest periods during the process, calories burned, the number of executions, and historical data.

Furthermore, the data storage unit can also store the records from the resistance generating unit 10.

Furthermore, the resistance generating unit 10 and the operating unit 30 can store data in a cloud server through internet connection. This allows the user to connect through the terminal device and access the data directly.

Furthermore, when the exercise course is executed, the operating unit 30 can also choose to activate the resistance mode and initiate the resistance generating unit 10. Therefore, the resistance adjustable power generator of this invention can simultaneously charge the battery 20 through the resistance generating unit 10 while the exercise course is executed.

Furthermore, the operating unit 30 can retrieve the record, display the record, and assist the user in achieving daily training goals.

Figure 7:
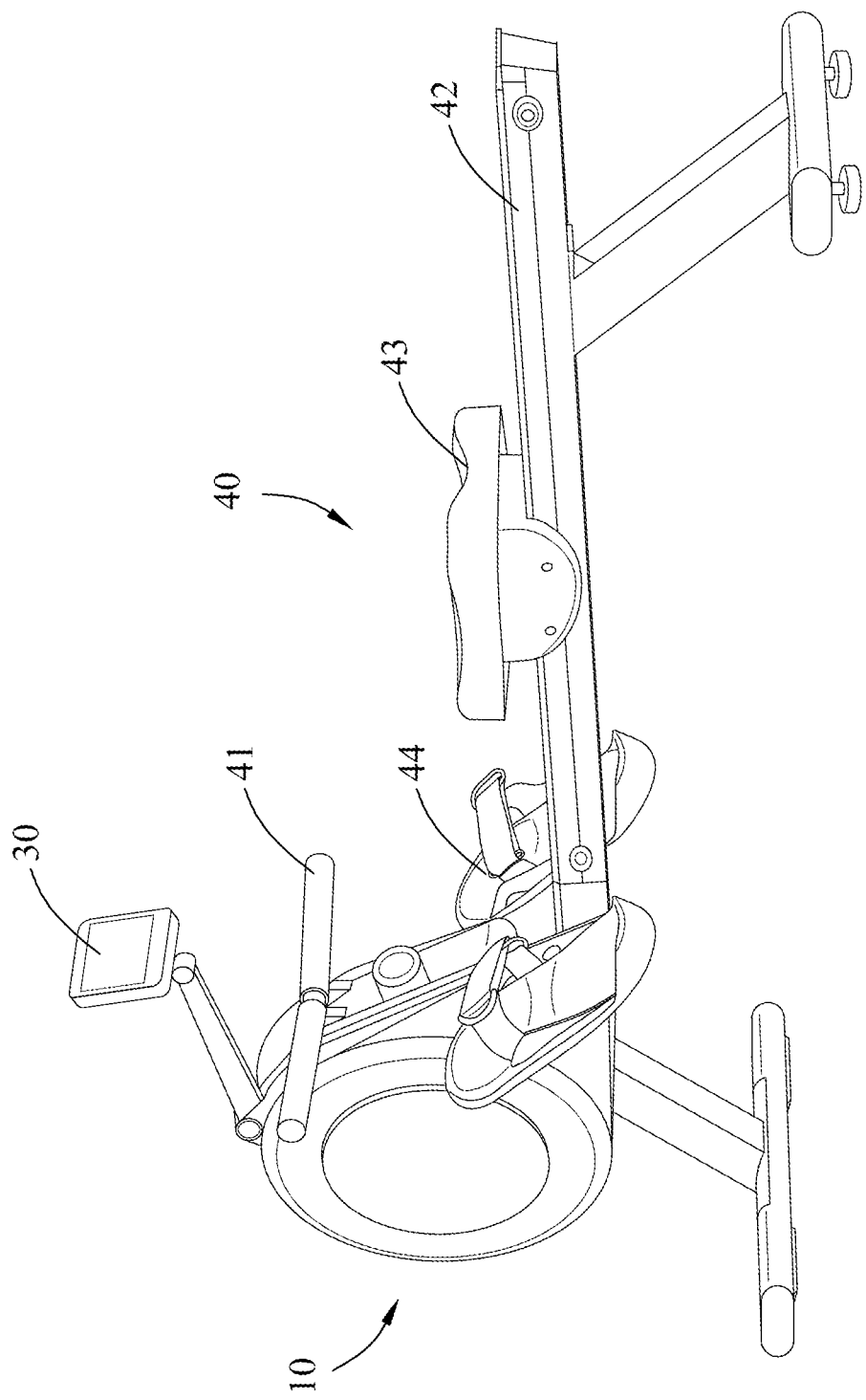
FIG. 7 is a schematic diagram of a preferred embodiment of a rowing machine with a resistance adjustable power generator in accordance with this invention.

With reference to FIG. 7, a preferred embodiment of a rowing machine 40 with the resistance adjustable power generator in accordance with this invention is shown. In this embodiment, the rowing machine has the operating unit 30, the battery 20 (not shown), the resistance generating unit 10, the connecting device coupled with the resistance generating unit 10, a chain (not shown) coupled with the connecting device, and a handle 41 connected to the chain. In this embodiment, the user can sit on a seat 43 and step on footrests 44 of the rowing machine 40, and the seat 43 can linearly move along a slide 42 of the rowing machine 40.

In this preferred embodiment, the operating unit 30 is in the form of a smart device with a touch panel, and the connecting device is the flywheel connected to the resistance generating unit 10. When the user starts to workout, the operating unit 30 sends the commands received from the user and activates the resistance mode of the resistance adjustable power generator and adjusts the scale of the resistance according to the commands. When the resistance mode is activated, the clutch 14 of the resistance generating unit 10 engages with the flywheel of the rowing machine 40 and provides a first level of resistance. The user can further adjust the strength of the resistance, with the resistance controlling center 11 of the resistance generating unit 10 further activates the resistance generators 12 and increases the strength of the resistance. Moreover, the resistance generating unit 10 can further increase or decrease the resistance by regulating the voltage and/or current output of the resistance generators 12 with output controlling center 13 to provide a wide range of resistance and smooth adjustment (i.e., the difference between the scales of neighboring resistance is miniscule).

In this preferred embodiment, the resistance of the resistance generating unit 10 is transmitted through the resistance generator 12 to the flywheel of the rowing machine 40, and then the resistance is further transmitted to the chain coupled with the flywheel and finally reaches the handles 41 attached to the chain. The electricity generated by the resistance generating unit 10 is then stored in the battery 20, and the battery 20 can provide electricity to the operating unit 30 of the rowing machine and may provide electricity to other devices of the user.

Figure 8:
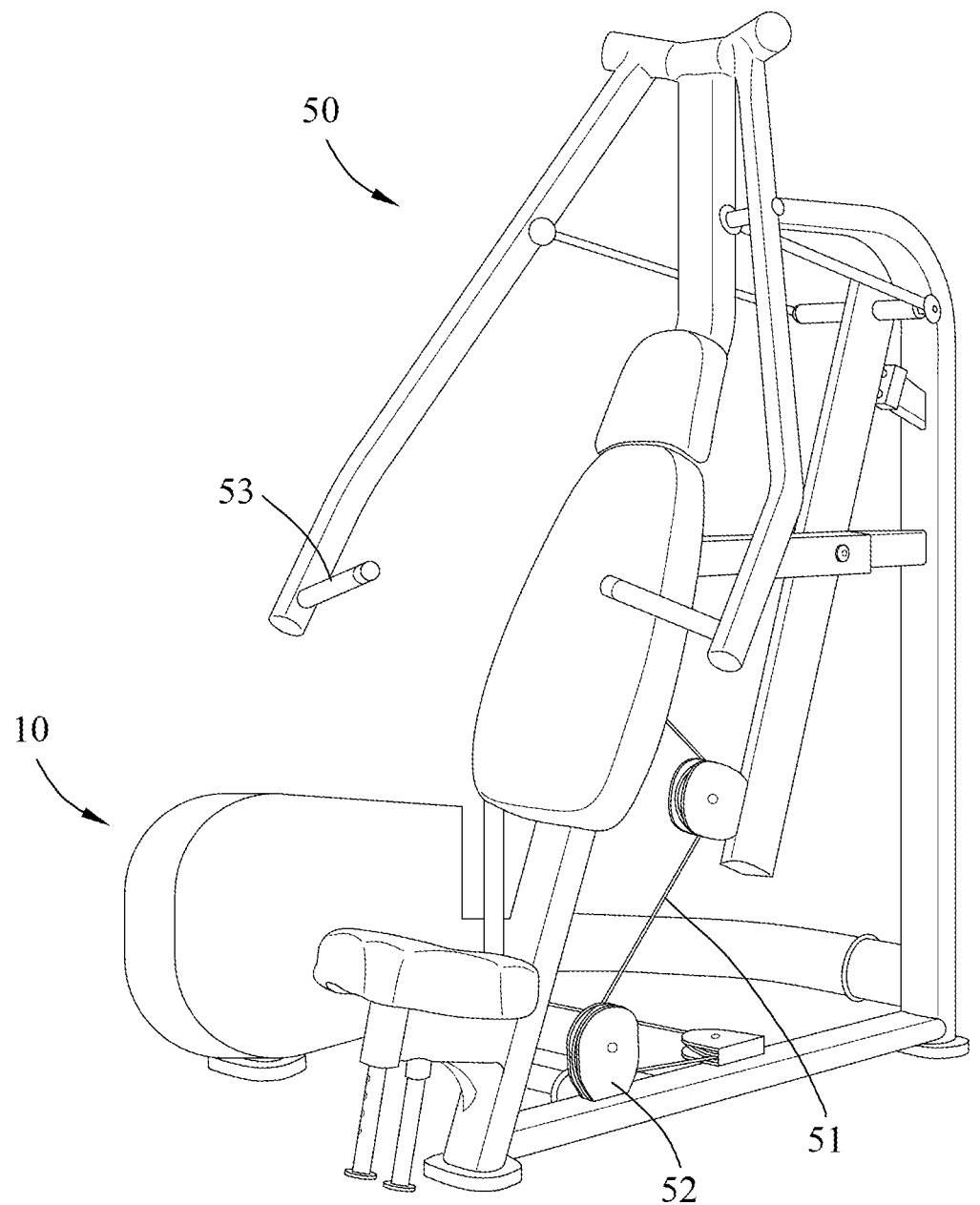
FIG. 8 is a schematic diagram of a preferred embodiment of a chest press machine with a resistance adjustable power generator in accordance with this invention.

With reference to FIG. 8, a preferred embodiment of a chest press machine 50 with the resistance adjustable power generator in accordance with this invention is shown. In this embodiment, the resistance adjustable power generator of the chest press machine 50 has the operating unit 30 (not shown), the battery 20 (not shown), the resistance generating unit 10, the connecting device coupled with the resistance generating unit 10, a cable 51 coupled with the connecting device, multiple pulleys 52, and a bar handle 53 connected to the cable 51.

In this preferred embodiment, the operating unit 30 is in the form of a smartphone of the user, and the connecting device is the flywheel connected to the resistance generating unit 10. When the user starts to workout, the operating unit 30 sends the commands received from the user and activates the resistance mode of the resistance adjustable power generator and adjusts the scale of the resistance according to the commands. When the resistance mode is activated, the clutch 14 of the resistance generating unit 10 engages with the flywheel of the chest press machine 50 and provides a first level of resistance. The user can further adjust the strength of the resistance, with the resistance controlling center 11 of the resistance generating unit 10 further activates the resistance generators 12 and increases the strength of the resistance. Moreover, the resistance generating unit 10 can further increase or decrease the resistance by regulating the voltage and/or current output of the resistance generators 12 with output controlling center 13 to provide a wide range of resistance and smooth adjustment (i.e., the difference between the scales of neighboring resistance is miniscule).

In this preferred embodiment, the resistance of the resistance generating unit 10 is transmitted through the resistance generator 12 to the flywheel of the chest press machine 50, and then the resistance is further transmitted to the cable 51 coupled with the flywheel and passing through multiple pulleys 52 to alter the direction of the resistive force, and finally reaches the bar handles 53 attached to the cable 51. The electricity generated by the resistance generating unit 10 is then stored in the battery 20, and the battery 20 can provide electricity to other devices of the user.

The resistance adjustable power generator in accordance with this invention can be applied to various fitness devices to provide resistance training of the user. The resistance adjustable power generator in accordance with this invention greatly reduces the sizes of the fitness devices and provides consistent resistance and harvests electricity at the same time during the training of the user.

What is claimed is:

1. A resistance adjustable power generator comprising an operating unit, a resistance generating unit, and a battery, wherein:

the operating unit receives commands of a user and exchanges signals or the commands with the resistance generating unit, and the operating unit is able to switch the resistance adjustable power generator to either a release mode or a resistance mode, wherein in the resistance mode, the resistance generating unit provides multiple levels of resistance to a connecting device; and the resistance generating unit receive the commands from the operating unit and provides adjustable multiple levels of resistance to the connecting device wherein the resistance generating unit comprises a resistance controlling center, multiple resistance generator, and an output controlling center, wherein the resistance controlling center controls movements of a clutch, controls the status of the multiple resistance generator, and controls an electrical energy output by the output controlling center to tune multiple levels of the resistance, wherein:

the clutch engages with the connecting device in the resistance mode and creates a first level of the resistance, and the clutch disengages from the connecting device in the riding mode, wherein the clutch is connected to an accelerator, and the accelerator increases the rotational speed of a coil winding in the resistance generator;

the resistance generator connects to the clutch and comprises the coil winding, wherein the coil winding generates electrical energy during rotation; and the output controlling center regulates output values of voltage and/or current to modify the load output and generates adjustable multiple levels of the resistance and stores the electrical energy into the battery.

2. The resistance adjustable power generator according to claim 1, wherein the clutch connects to the accelerator, and the accelerator comprises a hub gear mounted on a hub of the connecting device and a resistance gear mounted on the resistance generator, wherein the hub gear and the resistance gear are arranged to engage with each other directly or indirectly, and the number of teeth of the hub gear is greater than that of the resistance gear.

3. The resistance adjustable power generator according to claim 2, wherein the operating unit is a human-machine interface in a form of buttons, controllers, touch display panels, or mobile devices, and the operating unit receives inputs from a user, generates multiple commands, and sends the commands to the control center wirelessly or wired to tune multiple levels of the resistance.

4. The resistance adjustable power generator according to claim 2, wherein the operating unit further comprises a course database with multiple exercise courses, wherein the operating unit adjusts settings of the resistance generating unit based on predefined parameters of simulation conditions associated with the exercise course or parameters specified by an instructor of the exercise course.

5. The resistance adjustable power generator according to claim 1, wherein the accelerator comprises at least one planetary gearset.

6. The resistance adjustable power generator according to claim 5, wherein the operating unit is a human-machine interface in a form of buttons, controllers, touch display panels, or mobile devices, and the operating unit receives inputs from a user, generates multiple commands, and sends the commands to the control center wirelessly or wired to tune multiple levels of the resistance.

7. The resistance adjustable power generator according to claim 6, wherein:

the resistance generating unit comprises a resistance device; and the output controlling center adjust the resistance of the resistance device based on the electrical energy produced by the resistance generator.

8. The resistance adjustable power generator according to claim 6, wherein the operating unit further comprises a course database with multiple exercise courses, wherein the operating unit adjusts settings of the resistance generating unit based on predefined parameters of simulation conditions associated with the exercise course or parameters specified by an instructor of the exercise course.

9. The resistance adjustable power generator according to claim 6, wherein the resistance adjustable power generator is used in a fitness device.

10. The resistance adjustable power generator according to claim 9, wherein the fitness device is a rowing machine with a chain coupled to the connecting device.

11. The resistance adjustable power generator according to claim 9, wherein the fitness device is a chest press machine with a cable coupled to the connecting device.

12. The resistance adjustable power generator according to claim 5, wherein the operating unit further comprises a course database with multiple exercise courses, wherein the operating unit adjusts settings of the resistance generating unit based on predefined parameters of simulation conditions associated with the exercise course or parameters specified by an instructor of the exercise course.

13. The resistance adjustable power generator according to claim 5, wherein the resistance adjustable power generator is used in a fitness device.

14. The resistance adjustable power generator according to claim 1, wherein the connecting device is a rear wheel of a bicycle, a pulley, or a flywheel.

15. The resistance adjustable power generator according to claim 14, wherein the resistance adjustable power generator is used in a fitness device.

16. The resistance adjustable power generator according to claim 1, wherein the operating unit is a human-machine interface in a form of buttons, controllers, touch display panels, or mobile devices, and the operating unit receives inputs from a user, generates multiple commands, and sends the commands to the control center wirelessly or wired to tune multiple levels of the resistance.

17. The resistance adjustable power generator according to claim 1, wherein the operating unit further comprises a course database with multiple exercise courses, wherein the operating unit adjusts settings of the resistance generating unit based on predefined parameters of simulation conditions associated with the exercise course or parameters specified by an instructor of the exercise course.

18. The resistance adjustable power generator according to claim 1, wherein the resistance adjustable power generator is used in a fitness device.

19. The resistance adjustable power generator according to claim 18, wherein the fitness device is a rowing machine.

20. The resistance adjustable power generator according to claim 18, wherein the fitness device is a chest press machine.

* * * * *